April 17, 1934. J. G. HAWLEY 1,954,814
SHOCK ABSORBER
Filed July 2, 1930   3 Sheets-Sheet 1
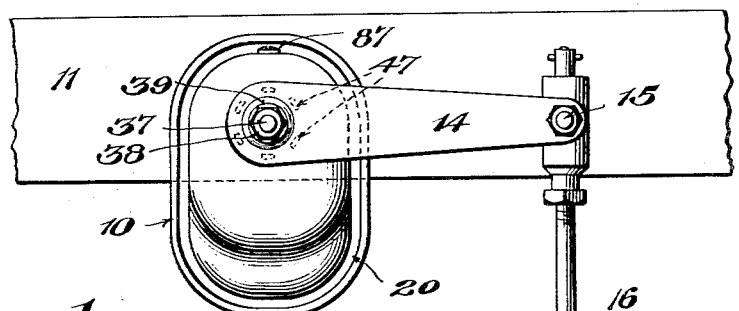
Fig.1.
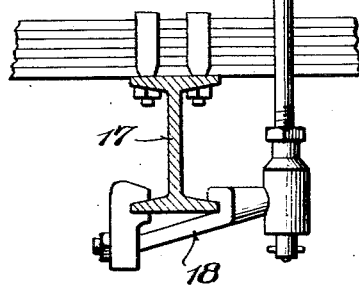
Fig.2.
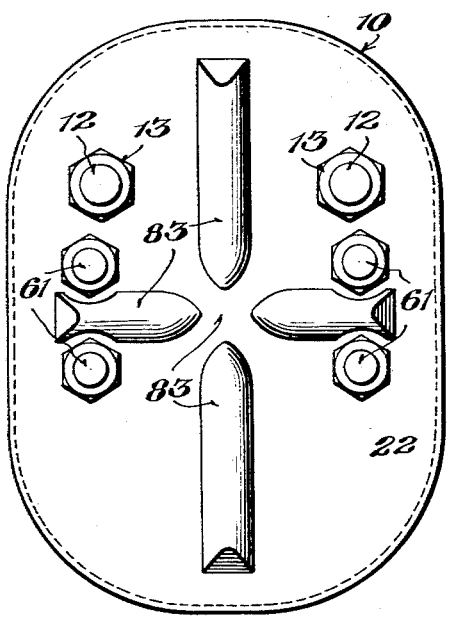
Fig.3.
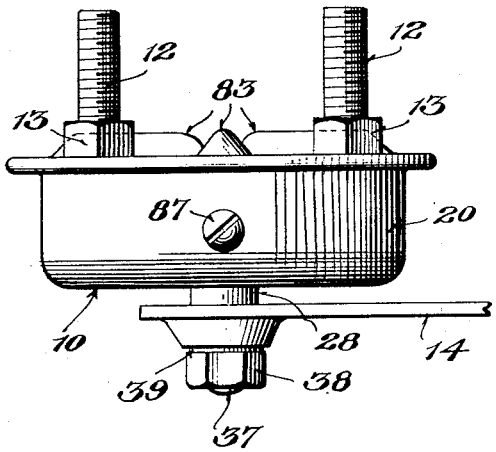
Inventor
Jesse G. Hawley,
By Albert T. St Clair
Attorney

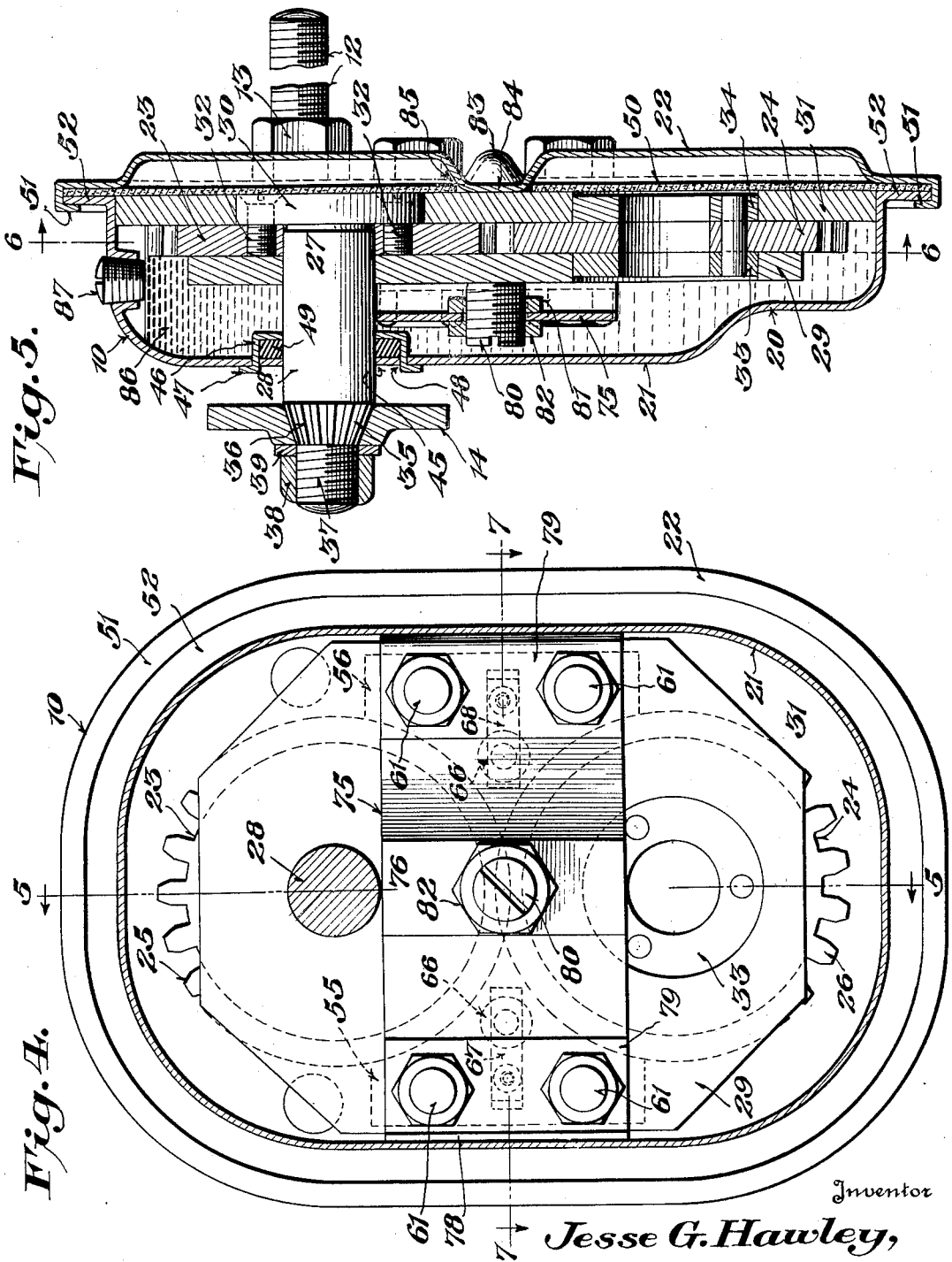

April 17, 1934.    J. G. HAWLEY    1,954,814
SHOCK ABSORBER
Filed July 2, 1930    3 Sheets-Sheet 3

CLEARANCE FOR
EXIT OF OIL

Inventor
Jesse G. Hawley,
By Albert T. St Clair
Attorney

Patented Apr. 17, 1934

1,954,814

UNITED STATES PATENT OFFICE 1,954,814

SHOCK ABSORBER

Jesse G. Hawley, Painted Post, N. Y., assignor to Hawley-Jones Corporation, Riverside, N. Y., a corporation of New York Application July 2, 1930, Serial No. 465,430

12 Claims. (Cl. 188—89)

This invention relates to the art of shock absorbers, and more particularly to shock absorbers actuated by hydraulic means.

While many hydraulic shock absorbers have heretofore been proposed, most of such devices have involved complicated valve mechanisms which were not only expensive to build but susceptible of many difficulties in operation, such as clogging of valves or wear, and consequently ineffective functioning after a limited period of service, and danger of breakage in cold weather, owing to the increased viscosity of the fluid medium, or leakage of the latter in warm weather.

I have discovered that these difficulties can be overcome, while preserving the advantages of a hydraulic shock absorber, by providing a pair of meshing gears which communicate with liquid containing pockets on either side of the meshing zone, and restricting the discharge of the liquid from the pocket on the expulsion side of the meshing zone, as well as providing means for insuring a continuous supply of liquid in each pocket.

By the term "gear", as used herein, I mean a gear as ordinarily defined, or a portion of a gear, such as a gear segment.

By the term "liquid medium", as used herein, I mean a non-gaseous fluid regardless of its viscosity, such as a light, medium or heavy liquid, including those having a high viscosity but still capable of slow flowing.

It is therefore an object of this invention to provide a new and improved shock absorber.

It is another object of this invention to provide a hydraulic shock absorber.

It is a further object of this invention to provide a double acting hydraulic shock absorber.

With the above and other objects in view, which will be apparent as the description proceeds, I have set forth my invention in the following specification and illustrated it in the accompanying drawings, in which:

Fig. 1 is a fragmentary view showing a side elevation of my new and improved shock absorber attached to the frame of a vehicle;

Fig. 2 is a vertical rear elevation of my shock absorber;

Fig. 3 is a top plan view of my shock absorber;

Fig. 4 is a vertical elevation of the interior of my shock absorber with the cover removed;

Fig. 5 is a vertical longitudinal section on the line 5—5 of Fig. 4;

Figure 6:
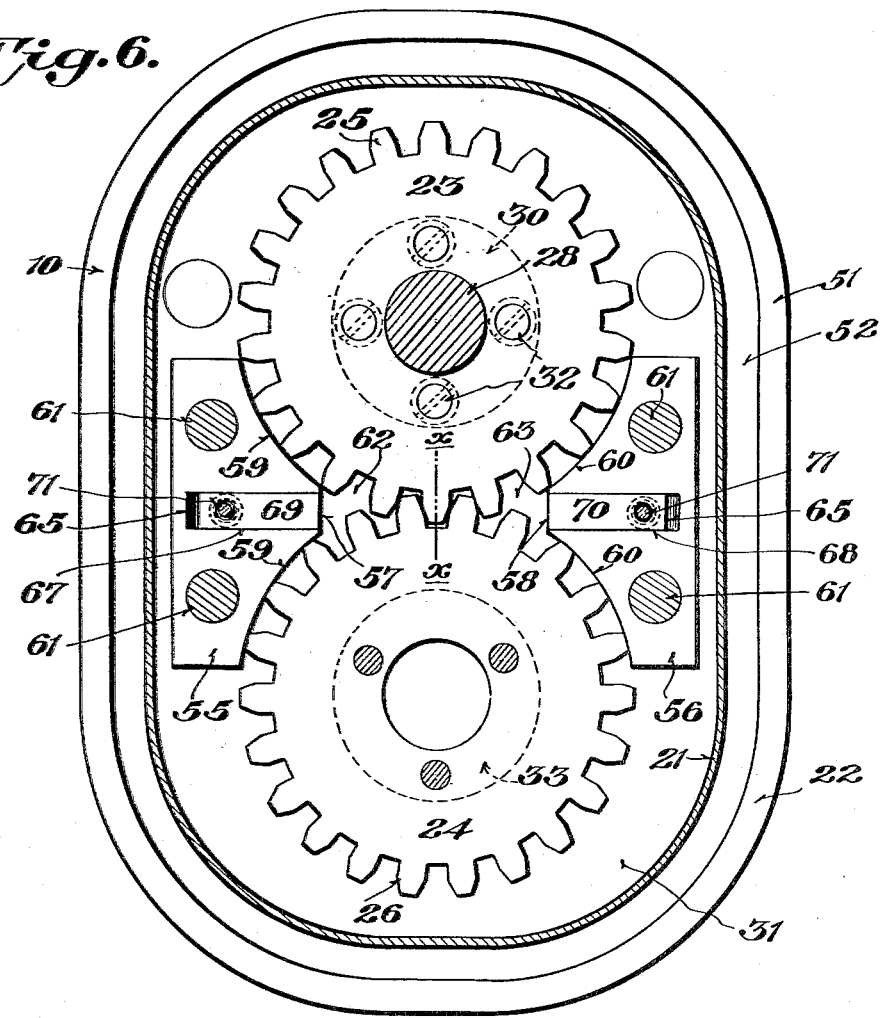
Fig. 6 is a view corresponding to Fig. 4 but with the truss member and top plate removed.

Referring to the accompanying drawings, which show a preferred embodiment of my new shock absorber, and particularly to Figs. 1 and 3 thereof, 10 designates my new shock absorber, which is attached to the frame 11, of the vehicle whose movements are to be cushioned by bolts 12, which project rearwardly from the shock absorber and pass through the frame 11, being secured thereto by suitable nuts 13 and lock washers (not shown).

As shown in Fig. 1, my shock absorber is provided with an operating handle 14 which is connected at 15 with one end of a link 16, whose opposite end is connected with the axle 17 of the vehicle by any suitable clamp 18.

My shock absorber 10 preferably comprises a housing 20, formed by cover and bottom portions 21 and 22, respectively, which encloses all the operating parts except the operating handle 14.

As best shown in Figs. 4-7, the operating parts of my shock absorber comprise a driving gear 23 and a driven gear 24, provided with teeth 25 and 26, respectively, that mesh with a very slight clearance. Gear 23 is provided with trunnions 27 which comprise an operating shaft 28 that projects through a top plate 29 and the housing cover 21 and terminates at its opposite end in an enlargement 30, which is seated in a bottom plate 31, the enlargement 30 being secured rigidly to the gear 23 by machine screws 32.

Gear 24 is provided with trunnions 33 and 34 which are preferably circular discs of equal diameter doweled to the gear 24, these discs being seated in the top and bottom plates respectively.

Operating shaft 28 terminates in a tapered portion 35, which is provided with longitudinally extending serrations 36, and with a threaded end portion 37, to receive operating handle 14, which is preferably secured in place thereon by a nut 38 and lock washer 39.

The housing cover 21 is provided with a recess 45 for the reception of the operating shaft 28, and a tight connection to prevent the escape of oil at that point is provided by the use of a cup shaped member 46 provided with a series of fingers 47 which are inserted thru a corresponding series of registering openings 48 in the housing cover 21, after which the fingers are upset. The cup is provided with any suitable sealing means, such as a felt washer 49.

To form a corresponding seal for the bottom portion 22 of the housing, the latter is provided with a suitable gasket, such as a cork gasket 50.

In practice the interior dimensions of the cover portion 21 are preferably made the same as the exterior dimensions of the bottom plate 31 so that these parts form a tight fit when the cover is mounted in position on the bottom 22, after which the periphery 51 of the latter is bent over the projecting edge 52 of the cover to permanently secure these members together.

Also mounted in the shock absorber are a pair of substantially triangularly shaped blocks 55 and 56, which are cut away at their inner portions, as indicated at 57 and 58, and are provided with curved sides 59 and 60, respectively, that have the same radius of curvature as the gears. These blocks are preferably so mounted with respect to the gears that there is only .001" clearance between the curved sides 59 and 60 and the gear teeth 25 and 26. The blocks are securely held in the desired position with respect to the gears and the bottom 22 of the housing by bolts 61, which also serve to retain the top and bottom plates 29 and 31 in position against the tops and bottoms of the triangular blocks, thus forming pockets 62 and 63 on either side of the meshing zone x—x of the gears 23 and 24. In practice the blocks 55 and 56 are preferably made approximately .001" thicker than the gears to give the latter freedom of movement with respect to the top and bottom plates, and to provide a limited oil clearance space to relieve the pressure created in pockets 62 and 63 by the turning of the gears.

Figure 7:
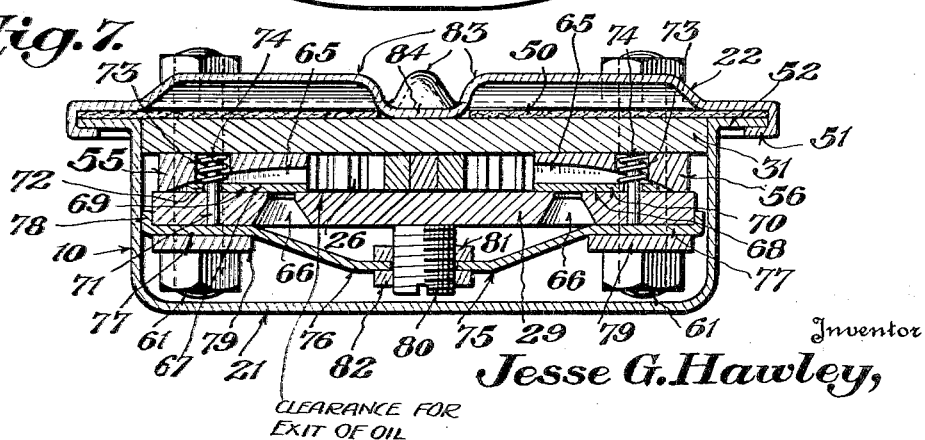
Fig. 7 is a horizontal transverse section on the line 7—7 of Fig. 4.

As shown in Figs. 6 and 7, each of the blocks 55 and 56 is provided with a milled slot 65 that registers with an oil passage 66 in top plate 29. The oil passages 66 are normally closed by valves 67 and 68, which preferably comprise flat plates 69 and 70 that are mounted in slots 65 and are retained in position by engagement with pins 71 that project from the top plate 29 and pass thru apertures 72 in the plates 69 and 70. The blocks 55 and 56 are also provided with apertures 73 that register with the pins 71 and are adapted to receive coiled springs 74, preferably of piano wire, that serve to normally hold the plates 69 and 70 of valves 67 and 68, respectively, in closed position, but which may be overcome to permit the opening of the valves as explained hereinafter.

As shown in Figs. 4, 5 and 7, the shock absorber is also preferably provided with a truss 75 which comprises a raised central body portion 76, flat intermediate portions 77 adapted to rest on the top plate 29, and overhanging end portions 78 adapted to overhang the edges of top plate 29 to prevent lateral displacement of the truss. Supporting plates 79, as shown in Figs. 4 and 7, are preferably provided for engagement with the intermediate portions of the truss to strengthen the latter where it is engaged and held in position by the bolts 61. The main purpose of the truss is to support the center portion of the top plate 29 so that it will not yield when a pressure is built up in pockets 62 and 63 and, for this purpose, the truss is provided with a bolt 80, lock washer 81 and nut 82, which pass through the raised portion of the truss. The bolt 80 is preferably adjusted so that it exerts a slight pressure against the top plate 29, after which the nut 82 is locked in position.

To correspondingly strengthen the bottom portion 22 of the housing, and provide a support for the center portion of the bottom plate 31, the bottom portion 22 of the housing is preferably provided with a plurality of ribs 83, which terminate just before they reach the center of the bottom portion, leaving a flat portion 84 which, during the shaping of the bottom, is struck up by an amount equal to the thickness of the gasket 50. The latter is provided with a corresponding aperture 85, thus permitting the flat portion to rest directly against the bottom plate.

In practice the shock absorber is preferably assembled by securing the trunnions 33 and 34 to driven gear 24 and by securing the operating shaft 28 and enlargement 30 to the driving gear 23, after which these members are mounted in the corresponding recesses in the bottom plate 31, which has been placed in position on the bottom portion 22 of the housing, after the latter has received gasket 50. The triangular blocks 55 and 56 are then placed in position on the bottom plate 31 and the coil springs 74 are placed in the corresponding apertures 73 in the blocks 55 and 56. The top plate 29 is then moistened with a drop of oil adjacent to each of the pins 71, which are preferably stamped out at the time the top plate is made, and the valve plates 69 and 70 are mounted with their apertures 72 in engagement with pins 71. The oil causes these parts to adhere when the top plate is now inverted to mount it in position over the operating shaft 28 and the upper trunnion 33 of gear 24. The truss 75 is then mounted above the triangular blocks and top plate, the reinforcing plates 79 are placed on the flat parts of the truss and the four bolts 61 are inserted thru the bottom 22 of the housing, and then thru the parts which have so far been assembled and tightened, with the result that all of the parts except the cover 21 and operating handle 14 are now secured together.

The bolt of the truss is then adjusted and the device is ready to receive the cover 21 which is applied as previously indicated, and the cover and bottom portions 21 and 22 of the housing are secured together as also previously explained.

The operating handle 14 is telescoped over the serrations 36 of shaft 28 and lock washer 39 and nut 38 are applied to complete the assembly of the shock absorber.

When ready to assemble the latter on a car, it is only necessary to substantially fill the shock absorber with oil 86 thru a filling plug 87 provided in the upper portion of cover 21 and attach the shock absorber to the frame 11 of the vehicle by the bolts 12. The end of the operating handle 14 is then connected with the axle 17 of the vehicle by means of a link 16 and the clamp 18, or in any other suitable manner.

While the oil level of the shock absorber may be at various heights it should be above the axis of the operating shaft 28 to assure a plentiful supply of oil, although in practice it is preferred to substantially fill the casing.

When a shock is transmitted to the shock absorber by the movement of the operating handle 14 this rotates the gear 23, for instance, in a clockwise direction. This is transmitted to the gear 24 and the teeth of both gears to the right of the meshing zone x—x act as buckets to convey the oil from the body of the housing into the pocket 63. Since this space was already filled with oil, and oil is incompressible, oil is forced out thru every available space, and this is mainly the clearance provided between the flat sides of the gears and the top and bottom plates 29 and 31. Since only an exceedingly minute portion of the oil can be conveyed thru the meshing zone, owing to the very small clearances which are provided between the teeth, and the clearances on either side of the gears are only approximately .0005", a resisting pressure is immediately encountered and this is proportional to the magnitude of the shock. Were it not for the valves 67 and 68 the operation just referred to would remove all of the oil from pocket 62 with the result that when the rebound started, there would be a markedly reduced pressure on that side of the meshing zone, and the shock absorber would not offer any resistance to the rebound until the gears had rotated sufficiently to cause the teeth, acting like buckets, to fill pocket 62. In other words, there would be no shock absorbing action during this period. To prevent this, the valves 67 and 68 are provided so that when oil is propelled out of pocket 62, leaving a reduced pressure therein, the greater, or substantially atmospheric, pressure in the main body of the housing unseats the free end of valve 67 and allows oil to pass from the body of the housing thru the corresponding oil passage 66 in top plate 29 into pocket 62. As soon as the pressure is equalized spring 74 closes the valve. The pocket on the opposite side of the meshing zone is consequently always maintained full of oil so that the shock absorber is always ready to offer a cushioning resistance when the rebound starts.

When the latter takes place the operation is just the reverse of that discussed. The teeth of the gears, acting like buckets, convey oil into pocket 62, which builds up a pressure therein that gives the shock absorbing action, and oil is removed from pocket 63 on the opposite side of the meshing zone, whereupon the differences in the pressure in pocket 63 and that in the body of the housing cause oil to pass thru valve 68 and maintain a full supply of oil in pocket 63.

It will be apparent that the greater the shock is the more rapidly oil will be forced into the pocket on the intake side and the greater will be the pressure which is built up therein, hence the greater would be the cushioning action and resistance to the shock.

It will also be obvious that there is no building up of pressure between shocks that occur in rapid succession.

Although the gears 23 and 24 are shown herein as being provided with teeth all the way around their peripheries, and such a construction is useful to permit a partial rotation of the gears to bring a new set of teeth into meshing position, and thereby compensate for any wear which may occur in the course of time, such a construction is not essential.

All of the parts of the shock absorber except the bolts, nuts, shafts and coil springs, are preferably stamped out, thus permitting the shock absorber to be constructed simply and cheaply. Where the shock absorber is designed for use on light vehicles the gears may be made relatively small, but for use on heavier vehicles the gears may be made larger.

It will therefore be apparent that I have developed a new and useful shock absorber which may be made in a variety of forms and sizes, may be used as either a one way or two way shock absorber, will have a direct cushioning action whose intensity is proportional to the magnitude of the actuating shock, does not build up pressure where a series of shocks are encountered in rapid succession, and which is simple and inexpensive to build and yet effective in operation.

It will be obvious that the details of my shock absorber may be varied in numerous ways, within the scope of the following claims, without departing from the spirit of my invention.

I claim:

1. In a shock absorber, the combination of a housing provided with a liquid medium, a pair of meshing gears mounted therein, means resisting the rapid turning of the gears in either direction, and means for preventing a decrease in pressure on either side of the meshing zone.

2. In a shock absorber, the combination of a housing provided with a liquid medium, a pair of meshing gears mounted therein, means positioned intermediate said gears to form a close fit with the gear teeth on either side of the meshing zone but spaced from the latter to form a pocket on each side thereof, means enclosing said pockets and the meshing zone to resist the rapid turning of the gears in either direction, and means for preventing a decrease in pressure in either pocket.

3. The shock absorber of claim 2, in which the means intermediate of the gears comprises substantially triangular blocks.

4. The shock absorber of claim 2, in which the last mentioned means comprises a pair of valves.

5. The shock absorber of claim 2, in which the means intermediate of the gears comprises substantially triangular blocks, and in which the means for preventing a decrease in pressure in either pocket comprises a valve mounted in each block.

6. The shock absorber of claim 2, in which the means intermediate of the gears comprises blocks which are slightly thicker than said gears to provide a restricted oil escape zone between the faces of the gears and the means for enclosing the pockets.

7. The shock absorber of claim 2, in which the means for preventing a decrease in pressure in either pocket comprises valves formed by spring pressed plates that are unseated to permit an inflow of oil into the pocket on the expulsion side of the meshing zone to replace the oil removed therefrom by the turning of the gears.

8. In a shock absorber, the combination of a housing substantially filled with oil, a pair of meshing gears, substantially triangular blocks positioned intermediate of said gears to form a close fit with the gear teeth on either side of the meshing zone, but spaced from the latter to form an oil pocket on each side thereof, top and bottom plates secured to the substantially triangular blocks and forming bearings for the gears, as well as closures for the pockets and meshing zone, and valves for automatically insuring the replenishment of the oil in the pockets.

9. In a shock absorber, the combination of an operating mechanism and a two part housing therefor, one of said housing parts constituting a ribbed rear support for the operating mechanism, and the other housing part constituting a cover for said operating mechanism and also serving as an oil reservoir, and said housing parts being rigidly secured together by a flange which is integral with one of said members.

10. In a shock absorber, the combination of a gear mechanism, an oil supply, means for restricting the passage of oil to resist movements of the gears in either direction, and an adjustable truss for preventing yielding by said restricting means.

11. A valve mechanism comprising a recessed member, an apertured cover therefor, a flat valve member mounted in said recessed member and adapted to normally cover said aperture, a pin extending from said apertured member and serving as a pivot for said valve member, and a spring for normally pressing said valve member against said cover.

12. In a shock absorber, the combination of a housing provided with a liquid medium, a pair of meshing gears mounted therein, means resisting the rapid turning of the gears in one direction, and means for preventing a decrease in pressure on the corresponding opposite side of the meshing zone.

JESSE G. HAWLEY.

CERTIFICATE OF CORRECTION.

Patent No. 1,954,814. April 17, 1934.

JESSE G. HAWLEY.

It is hereby certified that error appears in the printed specification of the above numbered patent requiring correction as follows: Page 1, line 60, after the numeral "11" strike out the comma; page 2, line 142, after "that" insert a comma; and page 3, line 148, claim 12, strike out "corresponding"; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.